United States Patent

[11] 3,572,762

[72] Inventor Jim T. Votaw
     P.O. Box 864, Vallejo, Calif. 94590
[21] Appl. No. 857,874
[22] Filed Sept. 15, 1969
[45] Patented Mar. 30, 1971

[54] EMERGENCY SAFEGUARD FOR TRAILERS
     7 Claims, 3 Drawing Figs.
[52] U.S. Cl. .................................................. 280/475
[51] Int. Cl. .................................................. B60s 9/02
[50] Field of Search ........................................ 280/150.5,
                                                    475, 477, 150 (A)

[56]           References Cited
           UNITED STATES PATENTS
940,194    11/1904   Roath ....................... 280/475(UX)
1,151,474   8/1915   Kepler ..................... 280/150A(UX)
2,583,840   1/1952   Hawkins ................... 280/477
2,924,463   2/1960   Livermont ................. 280/150.5
3,046,037   7/1962   Cain ........................ 280/477

FOREIGN PATENTS
460,462    1/1937    Great Britain ............. (280/150.5)

Primary Examiner—Leo Friaglia
Attorney—George B. White

ABSTRACT: In the event the front end of the trailer is dropped by reason of the towing vehicle breaking away from the trailer, or blow out of a rear tire of the towing vehicle, or breaking of an axle of the towing vehicle on either side, or failure of either of the overload springs of the towing vehicle, or the like, a leaf spring mounted on each of the converging sides of the V-shaped forward end of the trailer frame safeguards the trailer against damage or fatal accident. Each leaf spring extends downwardly and rearwardly and the free end of each spring is formed into an upwardly curved shoe spaced from the ground so as to normally ride over bumps, high curbs, or other obstacles, and to skid along the road surface and support the forward end of the trailer when said forward end is dropped for any reason.

PATENTED MAR 30 1971  3,572,762
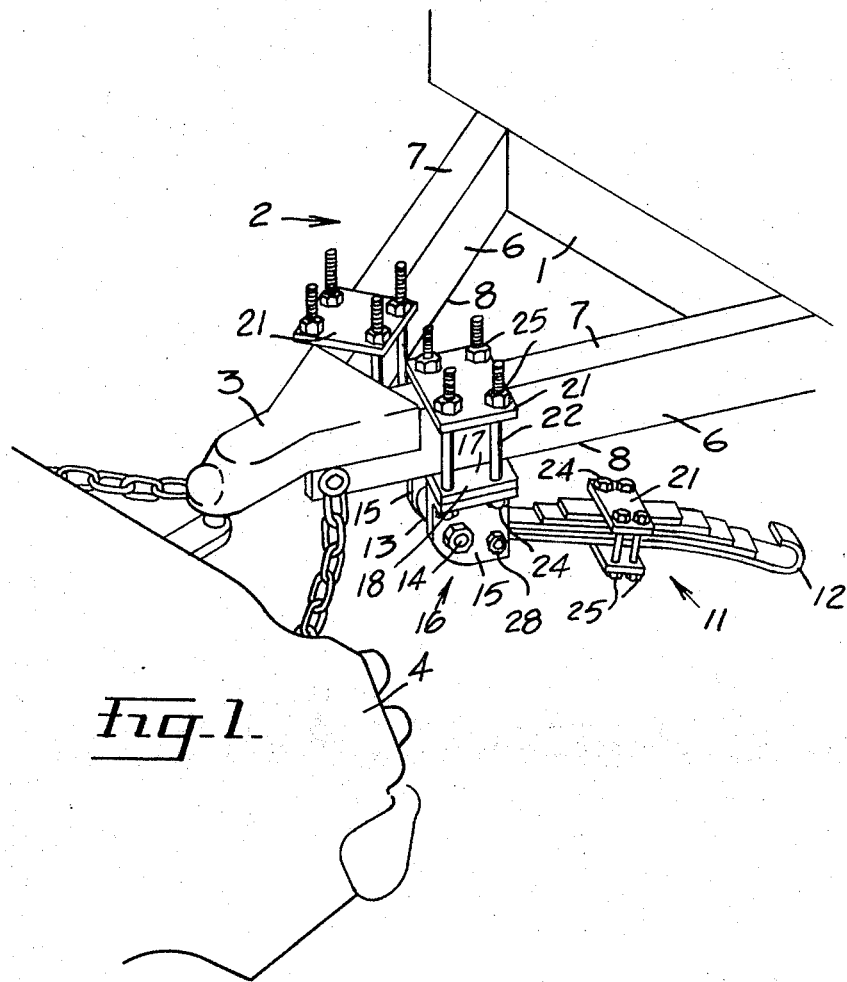
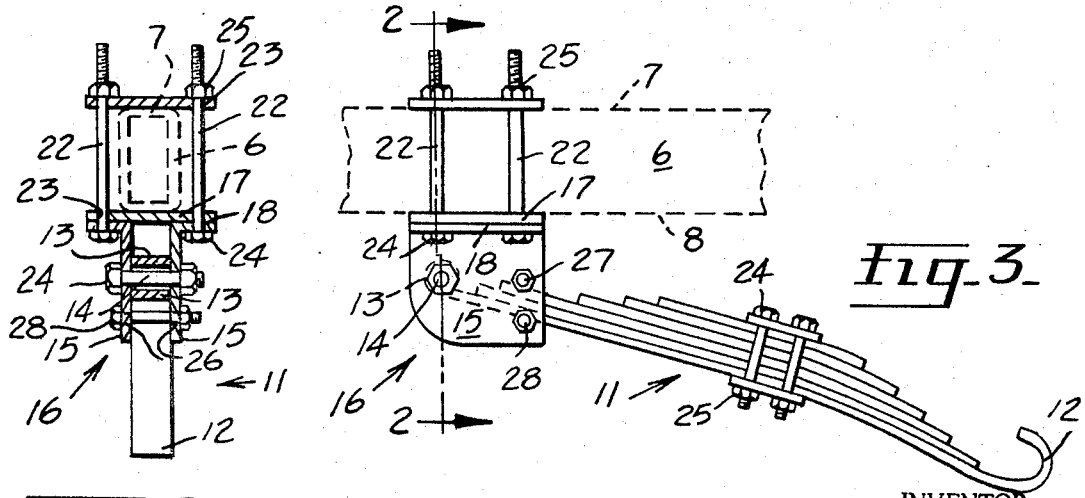
Fig. 1.
Fig. 2.
Fig. 3.
INVENTOR.
JIM T. VOTAW
BY George B. White
ATTORNEY

3,572,762

EMERGENCY SAFEGUARD FOR TRAILERS

BACKGROUND OF THE INVENTION

There are in the prior art various adjustable or retractable supports for the tongue or forward end of a trailer, and also some shoes for the tongue of a trailer frame, which however are incapable of automatically safeguarding against damage when the forward end of the trailer is dropped accidentally while it is towed by a towing vehicle.

An object of the invention is to provide a positive, yet resilient, support below the usually V-shaped forward end of the trailer frame, capable of skidding along the road surface when the forward end of the trailer is accidentally disconnected or dropped.

Another object of the invention is to provide firm support for the forward end of the trailer frame which is in supporting position at all times while the trailer is towed and which is ready and capable to safeguard the trailer from accidental damage due to failure of the towing connection or of the towing vehicle.

DESCRIPTION OF THE DRAWINGS

FIG. 1 is a fragmental perspective view of the forward end of a trailer frame connected to a towing vehicle, and of the safeguard device thereon.

FIG. 2 is a sectional view on lines 2-2 of FIG. 3.

FIG. 3 is a side view of the device.

DETAILED DESCRIPTION

A trailer frame 1 has a usually V-shaped forward end 2 to support a tongue 3 for hitching to a towing vehicle 4. The forward end 2 is usually formed by converging sides 6, each of which has a flat top 7 and flat bottom 8.

The safeguard device includes a bowed leaf spring 11 with an upwardly curved shoe 12 at the free end of its longest leaf. The pivoted end 13 of the leaf spring 11 is supported on a shackle bolt 14, which latter is held in spaced parallel sides 15 of a substantially U-shaped bracket 16. The concave bottom of the bowed leaf spring 11 faces toward the ground.

The U-shaped bracket 16 has a flat top 17 from which extend downwardly the sides 15 so as to straddle the pivoted end 13 of the leaf spring 11. The bracket 16 is of about the same width as the width of the side 15, but it has a longitudinal flanges 18. Four bolts 22 extend through registering holes 23 through the flanges 18 and the clamping plate 21 so that bolt heads 24 are below the flanges 18 and the bolts project above the clamping plate 21 and the device is tightly clamped against the frame side 6 by suitable nuts 25 bearing against the top of the clamping plate 21.

Each bracket side 15 has a pair of aligned holes 26 to accommodate an upper limit bolt 27 and a lower limit bolt 28. The pivoted portion of the leaf spring 11 is confined between the limit bolts and AND 28. The number of leaves in the leaf spring is suited to the size and weight of the trailer. The limit bolts 27 and 28 hold the leaf spring 11 at an angle diverging rearwardly from the bottom 8 of the frame side 6 and hold the skid shoe 12 at a proper spacing from the ground. When the trailer is parked, the front end is supported in the usual manner on blocks or jacks or the like, and then the upper bolt 27 is pulled out and the leaf spring 11 is swung up to the bottom 8 and the upper bolt 27 is replaced to hold the leaf spring 11 there.

The clamping bolts 22 are of such length as to permit adjustment of the height of the bracket 16 and the leaf spring 11, by placing suitable spacer block or blocks between the bracket top 17 and the bottom 8 of the frame side 6. It is preferable that the height of the leaf spring be so adjusted that the shoe 12 is spaced from the ground approximately a distance equal to the diameter of the tire of the towing vehicle.

I claim:

1. In a support for safeguarding the forward end of a trailer frame:
   a leaf spring;
   mounting means to mount an end of the leaf spring on said forward end so that said leaf spring diverges downward and rearward ward from said frame; and
   a shoe on the free end of said leaf spring adapted to slide on the ground when said forward end is dropped toward the ground.

2. The trailer safeguard specified in claim 1, and said shoe being formed by the upwardly curved end of the longest leaf of the leaf spring, said longest leaf being farthest away from said frame.

3. The trailer safeguard specified in claim 1, and:
   said mounting means including a yoke bracket downwardly extending from said forward end of said frame and straddling the mounted end of said leaf spring;
   a pivot anchor in said bracket supporting the mounted end of said leaf spring in said bracket; and
   means on said bracket spaced from said pivot anchor for bracing said leaf spring in said diverging position.

4. The trailer safeguard specified in claim 3, and said bracing means comprising spaced transverse members one above the other below said leaf spring thereby to brace said leaf spring when said forward end is dropped on the ground.

5. The trailer safeguard specified in claim 4, and at least one member above said leaf spring being removable and replaceable and being spaced from the top of said bracket to accommodate said leaf spring in an out of the way position adjacent said forward end of said frame.

6. The trailer safeguard specified safeguard claim 1, and:
   said mounting means including a substantially U-shaped bracket;
   the flat closed end of said bracket fitting against the underface of said frame;
   outwardly projecting flanges on said bracket along the adjacent edge of said frame;
   a mounting plate fitting over the top face of said frame;
   a plurality of bolts extending upwardly from said flanges along opposite sides of said frame;
   said mounting plate having holes therethrough in registry with said bolts and said bolts extending above said plate; and
   threaded clamping elements on the ends of said bolts bearing against said plate to clamp said bracket against said plate.

7. The trailer safeguard specified in claim 6, and said forward end of said frame being formed by forwardly converging structural elements, and there is a mounting means on each of said elements supporting a leaf spring.

UNITED STATES PATENT OFFICE
CERTIFICATE OF CORRECTION

Patent No. 3,572,762  Dated  March 30, 1971

Inventor(s)  Jim T. Votaw

It is certified that error appears in the above-identified patent and that said Letters Patent are hereby corrected as shown below:

Column 1, line 44, after "longitudinal" insert -- flange 18 along each side thereof in continuation of its top 17.
A clamping plate 21 is placed on the top of the side 6, extends over the longitudinal --; line 54, after "the limit b insert -- 27 --; same line 54, cancel "AND". Column 2, line 1 after "rearward" cancel "ward".

Signed and sealed this 7th day of September 1971.

(SEAL)
Attest:

EDWARD M. FLETCHER, JR.  ROBERT GOTTSCHALK
Attesting Officer  Acting Commissioner of Pate